United States Patent [19]

Mayer et al.

[11] Patent Number: 4,962,190
[45] Date of Patent: Oct. 9, 1990

[54] AZO DYES CONTAINING POLYETHYLENEIMINE WITH AN ANILINE DIAZO COMPONENT AND A HYDROXYNAPHTHALENE, AMINOPYRIDINE OR ACETOACETIC COUPLING COMPONENT

[75] Inventors: Udo Mayer, Frankenthal; Friedrich-Wilhelm Raulfs, Mannheim, both of Fed. Rep. of Germany

[73] Assignee: BASF Aktiengesellschaft, Ludwigshafen, Fed. Rep. of Germany

[21] Appl. No.: 273,917

[22] Filed: Nov. 21, 1988

[30] Foreign Application Priority Data

Nov. 21, 1987 [DE] Fed. Rep. of Germany ....... 3739456

[51] Int. Cl.$^5$ ............... C09B 69/10; C09D 11/02; D06P 1/52
[52] U.S. Cl. .................. 534/573; 106/22; 106/23; 106/496; 534/639; 534/751; 534/804
[58] Field of Search ............ 534/639, 573 P, 751, 534/804

[56] References Cited

U.S. PATENT DOCUMENTS

| | | | |
|---|---|---|---|
| 2,473,403 | 6/1949 | Woodward | 534/573 X |
| 3,278,486 | 10/1966 | Meek et al. | 534/573 X |
| 3,337,288 | 8/1967 | Horiguchi et al. | 534/573 X |
| 3,787,173 | 1/1974 | Greenshields et al. | 8/1 E |
| 3,937,851 | 2/1976 | Bellanca et al. | 426/540 |
| 4,182,612 | 1/1980 | Sokol et al. | 8/10.8 |
| 4,375,357 | 3/1983 | Wingard, Jr. et al. | 8/647 |
| 4,664,708 | 5/1987 | Allen et al. | 106/22 |

FOREIGN PATENT DOCUMENTS

| | | | |
|---|---|---|---|
| 2018855 | 11/1971 | Fed. Rep. of Germany | 534/573 |
| 2044924 | 3/1972 | Fed. Rep. of Germany | 534/573 |
| 1310583 | 10/1962 | France | 534/573 |

OTHER PUBLICATIONS

Allen, Chemical Abstracts, vol. 107, #98387g (1987).

Bellanca et al., Chemical Abstracts, vol. 84, #181300a (1976).
Engelhardt et al., Chemical Abstracts, vol. 77, #36364 (1972).
Greenshields et al., Chemical Abstracts, vol. 78, #31333a (1973).
Heid et al., Chemical Abstracts, vol. 76, #73721q (1972).
Wingard et al., Chemical Abstracts, vol. 98, #18127p (1983).
Color Index, vol. 4, 3rd Ed., pp. 4118, 4129, 4622 (1971).
Patent Abstracts of Japan, Band 8, No. 114 (C–225) [1551], May 26, 1984.

Primary Examiner—Floyd D. Higel
Attorney, Agent, or Firm—Oblon, Spivak, McClelland, Maier & Neustadt

[57] ABSTRACT

Polyethyleneimine-containing azo dyes of the formula

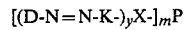

$$[(D-N=N-K-)_y X-]_m P$$

where
D is the radical of a diazo component which is derived from an isocyclic aromatic amine or from a heteroaromatic amine and is free of hydroxysulfonyl groups,
K is the radical of a coupling component of the hydroxynaphthalene, aminopyridine or pyrazolone series which has at most one hydroxysulfonyl group, or is the radical of a coupling component derived from acetoacetic acid,
y is 1 or 2,
X is a covalent bond or a bridge member if y is 1 or a bridge member if y is 2, and
P is the radical of a polyethyleneimine whose degree of polymerization n is from 5 to 25000, and the number m of chromophore radicals is dependent upon the degree of polymerization n and is defined by the ratio m:n = from 1:1 to 1:35, with the proviso that when K is substituted by hydroxysulfonyl the ratio m:n is from 1:2 to 1:35, are useful for dyeing or printing fiber materials and for preparing inks for the ink jet process.

3 Claims, No Drawings

AZO DYES CONTAINING POLYETHYLENEIMINE WITH AN ANILINE DIAZO COMPONENT AND A HYDROXYNAPHTHALENE, AMINOPYRIDINE OR ACETOACETIC COUPLING COMPONENT

The present invention relates to novel polyethyleneimine-containing azo dyes where the diazo component is derived from an isocyclic aromatic amine or from a heteroaromatic amine and is free of hydroxysulfonyl groups and where the coupling component comes from the hydroxynaphthalene, aminopyridine or pyrazolone series and has at most one hydroxysulfonyl group, or where the coupling component is derived from acetoacetic acid, where the polyethyleneimine radical, whose degree of polymerization n is from 5 to 25000, is bonded to the coupling component via a covalent bond or via a bridge member, and where the ratio of chromophore: monomer unit is from 1:1 to 1:35, depending on the degree of polymerization n, but if the coupling component is substituted by hydroxysulfonyl is from 1:2 to 1:35, and to the use of these dyes for dyeing or printing fiber materials or for preparing inks for the ink jet process.

Azo dyes containing a polyethyleneimine group are known for example from DE-A-No. 2,018,855, DE-A-No. 2,214,966, U.S. Pat. Ser. No. 3,937,851, U.S. Pat. Ser. No. 4,375,357 or U.S. Pat. Ser. No. 4,664,708. However, it has been found that the dyes described therein have application defects. In particular, they are insufficiently soluble in an acid medium.

It is an object of the present invention to provide new polyethyleneimine-containing azo dyes which are free of the disadvantages mentioned.

We have found that this object is achieved with novel polyethyleneimine-containing azo dyes of the formula I

where

D is the radical of a diazo component which is derived from an isocyclic aromatic amine or from a heteroaromatic amine and is free of hydroxysulfonyl groups, K is the radical of a coupling component of the hydroxynaphthalene, aminopyridine or pyrazolone series which, if substituted by hydroxysulfonyl, has at most one hydroxysulfonyl group, or is the radical of a coupling component derived from acetoacetic acid, y is 1 or 2, X is a covalent bond or a divalent bridge member if y is 1 or a bridge member if y is 2, and P is the radical of a polyethyleneimine whose degree of polymerization n is from 5 to 25000, and the number m of chromophore radicals is dependent upon the degree of polymerization n and is defined by the ratio m:n=from 1:1 to 1:35, with the proviso that when K is substituted by hydroxysulfonyl the ratio m:n is from 1:2 to 1:35.

Amines of the isocyclic aromatic series are for example aniline and derivatives thereof, aminonaphthalene and derivatives thereof and aminoanthraquinone and derivatives thereof.

Amines of the heteroaromatic series are derived for example from pyrazole, imidazole, oxazole, isoxazole, thiazole, isothiazole, thiophene, benzimidazole, benzoxazole, benzisoxazole, benzothiazole, benzisothiazole or benzothiophene.

The amines used as diazo components may be monosubstituted or polysubstituted. Suitable substituents are for example $C_1-C_4$-alkyl, halogen, in particular chlorine or bromine, hydroxyl, $C_1-C_4$-alkoxy, $C_1-C_4$-alkanoylamino, nitro, formyl, $C_1-C_4$-alkoxycarbonyl, carbamoyl, $C_1-C_4$-monoalkyl- or -dialkyl-carbamoyl, cyano, unsubstituted or $C_1-C_4$-alkyl-, $C_1-C_4$-alkoxy- or halogen-substituted phenylazo or unsubstituted or $C_1-C_4$-alkyl-substituted benzothiazol-2-yl.

Specific substituents are for example methyl, ethyl, propyl, isopropyl, butyl, isobutyl, sec-butyl, fluorine, chlorine, bromine, methoxy, ethoxy, propoxy, isopropoxy, butoxy, isobutoxy, sec-butoxy, formylamino, acetylamino, propionylamino, butyrylamino, isobutyrylamino, methoxycarbonyl, ethoxycarbonyl, propoxycarbonyl, isopropoxycarbonyl, butoxycarbonyl, isobutoxycarbonyl, sec-butoxycarbonyl, mono- or dimethylcarbamoyl, mono- or diethylcarbamoyl, mono- or dipropylcarbamoyl, mono- or diisopropylcarbamoyl, mono- or dibutylcarbamoyl, N-methyl-N-ethylcarbamayl, phenylazo, 2-methylphenylazo, 4-methylphenylazo, 2-methoxyphenylazo, 4-methoxyphenylazo, 2-chlorophenylazo, 4-chlorophenylazo, benzothiazol-2-yl or 6-methylbenzothiazol-2-yl.

A diazo component radical D of an amine $D-NH_2$ of the isocyclic aromatic series is preferably derived from aniline which may be monosubstituted or polysubstituted.

Examples are the following diazo components: aniline, 2-methylaniline, 4-chloroaniline, 3,5-dichloroaniline, 2-hydroxyaniline, 2-methoxyaniline, 4-methoxyaniline, 2,5-dimethoxyaniline, 3-acetylaminoaniline, 4-acetylaminoaniline, 2-methoxy-4-acetylaminoaniline, 3-methoxy-4-acetylaminoaniline, 3-nitroaniline, 2,5-dinitroaniline, 3-aminobenzaldehyde, methyl anthranilate, ethyl anthranilate, anthranilamide, 3-aminobenzamide, 4-aminobenzamide, 3-amino-2-methoxybenzamide, 2-dimethylcarbamoylaniline, 3-dimethylcarbamoylaniline, 4-dimethylcarbamoylaniline, 2-cyanoaniline, 3-cyanoaniline, 4-cyanoaniline, 2-cyano-4-nitroaniline, 4-phenylazoaniline, 4-phenylazo-2-methylaniline, 4-(2-methylphenylazo)aniline, 4-(2-methylphenylazo)-2-methylaniline, 4-(benzothiazol-2-yl)aniline or 4-(6-methylbenzothiazol-2-yl)aniline.

A diazo component radical D derived from an amine $D-NH_2$ of the heteroaromatic series preferably comes from the benzothiazole series. Examples are 2-aminobenzothiazole, 2-amino-6-methylbenzothiazole and 2-amino-6-methoxybenzothiazole.

What is important is that the diazo component $D-NH_2$ contain no hydroxysulfonyl group.

The coupling component radical K is derived for example from a coupling component KH of the hydroxynaphthalene, aminopyridine or pyrazolone series and if substituted by hydroxysulfonyl has at most one hydroxysulfonyl group. The radical K can also be derived from acetoacetic acid, for example from methyl or ethyl acetoacetate.

The coupling component KH is preferably a member of the hydroxynaphthalene series. These hydroxynaphthalenes may be monosubstituted or polysubstituted. Suitable substituents, besides hydroxysulfonyl, are for example carboxyl, $C_1-C_4$-alkoxycarbonyl, amino or $C_1-C_4$monoalkylamino.

Examples are the hydroxynaphthalenes of the formulae II to VIII:

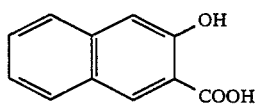 (II)

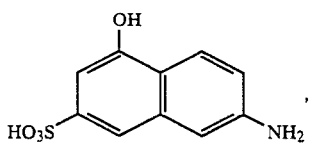 (III)

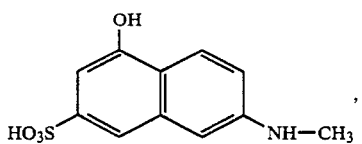 (IV)

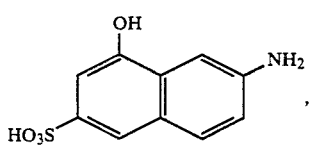 (V)

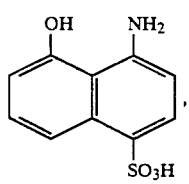 (VI)

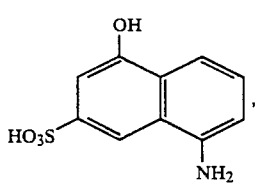 (VII)

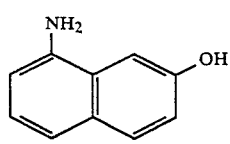 (VIII)

Particularly preferred coupling components of the hydroxynaphthalene series are the hydroxynaphthalenes II and III.

A coupling component KH which is an aminopyridine or a pyrazolone is for example a 2-aminopyridine- or a 1-phenylpyrazol-5-one-3-carboxylic acid derivative.

Such derivatives conform to the formula IX or X

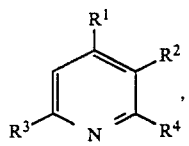 (IX)

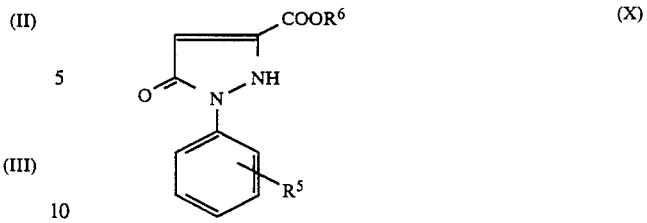 (X)

where
R¹ is $C_1$-$C_4$-alkyl,
R² is hydrogen, cyano or carbamoyl,
R³ is hydrogen, hydroxyl, $C_1$-$C_6$-alkoxy, which may be interrupted by one or two oxygen atoms, substituted or unsubstituted phenoxy, amino, $C_1$-$C_6$-monoalkyl- or -dialkyl-amino, where the alkyl chain may in each case be interrupted by one or two oxygen atoms, or substituted or unsubstituted phenylamino,
R⁴ is chlorine or the radical R³, R³ being as defined above,
R⁵ is hydrogen, $C_1$-$C_4$-alkyl, $C_1$-$C_4$-alkoxy or halogen, in particular chlorine or bromine, and
R⁶ is hydrogen or $C_1$-$C_4$-alkyl.

Preference is given in this case to those dyes of the formula I where the radical K is derived from the coupling component of the formula IX.

Alkyl groups appearing in the radical R³ are for example methyl, ethyl, propyl, isopropyl, butyl, isobutyl, sec-butyl, pentyl, isopentyl, neopentyl, tertpentyl, hexyl, isohexyl, 2-methoxyethyl, 2-ethoxyethyl, 3,6-dioxaheptyl or 3,6-dioxaoctyl.

Substituted phenyl groups appearing in the radical R³ are substituted for example by $C_1$-$C_4$-alkyl, $C_1$-$C_4$ alkoxy or halogen.

In the dyes of the formula I according to the invention, X is, if y is 1, a bridge member or a covalent bond or, if y is 2, a bridge member, in all cases the link to the polyethyleneimine radical P being via a nitrogen atom.

If the coupling component KH has a carboxyl group or a derivative thereof, as is the case for example with the components of the formula II or X or with the acetoacetic acid derivatives, then X is a covalent bond. In this case the link to the polyethyleneimine radical is direct via the (derivatized) carboxyl group (by reaction with the polyethyleneimine), as is illustrated by the following formula fragment:

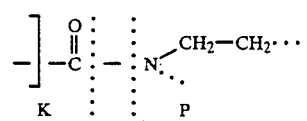

If the coupling component KH is derived from an aminopyridine derivative of the formula IX where R⁴ is chlorine, X is likewise a covalent bond. In this case, the link is directly via the pyridine ring with chlorine being replaced by the polyethyleneimine radical, as is illustrated by the following formula fragment:

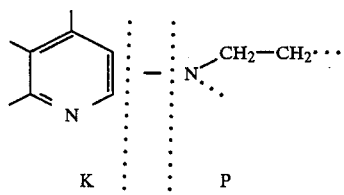

If X is a bridge member, for example the following radicals are suitable:

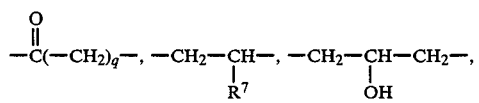

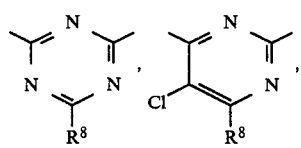

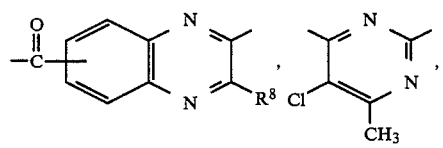

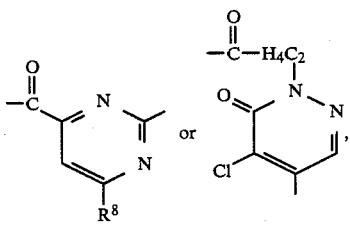

where
q is from 0 to 4, preferably 1 or 2,
$R^7$ is hydrogen or methyl and
$R^8$ if y is 1, is amino, $C_1$-$C_4$-monoalkyl- or dialkylamino, $C_1$-$C_4$-alkoxy, phenylamino, which may be substituted by $C_1$-$C_4$-alkyl, $C_1$-$C_4$-alkoxy or halogen, in particular chlorine or bromine, or phenyl, or, if y is 2, is the radical D—N=N—K— where D and K are each as defined above.

In this case the bridge members link the polyethyleneimine radical to the amino or $C_1$-$C_4$-alkylamino group on the coupling component. The important aspect here is that in the case of potential trifunctional bridge members in each case only one polyethyleneimine radical P is linked to the bridge member, as is indeed expressed by the abovementioned formulaic styling.

In the abovementioned formula I, P is the radical of a polyethyleneimine whose degree of polymerization n is from 5 to 25000, preferably from 10 to 20000, in particular from 35 to 1000. Such polyethyleneimines, which in general are branched and have primary, secondary and tertiary amino groups, are known per se. They are obtainable by polymerizing ethyleneimine in aqueous solution in the presence of acid catalysts.

The product of the polymerization is in general an approximately 50% strength by weight aqueous solution having a viscosity of from 200 to 40000 mPas at 20° C. Such solutions can be used directly for synthesizing the dyes according to the invention.

The number m of chromophore radicals bonded by a covalent bond or via a bridge member to the polyethyleneimine radical is dependent upon the degree of polymerization n and is defined by the ratio m:n. According to the invention, the ratio m:n is from 1:1 to 1:35, preferably from 1:3 to 1:20. In other words, on average there is a chromophore radical for every 1–35, preferably 3–20, monomer units of the polyethyleneimine, where chromophore radical is the radical (D-N=N-K-)$_y$X- where D, K, X and y are each as defined above. If the radical K is substituted by hydroxysulfonyl, the ratio m:n is from 1:2 to 1:35, preferably from 1:3 to 1:20.

The dyes of the formula I according to the invention are advantageously obtained by first reacting those coupling components KH which have an amino or $C_1$-$C_4$-alkylamino group in a conventional manner with a precursor compound of the bridge member. Such precursor compounds are for example components of the formula

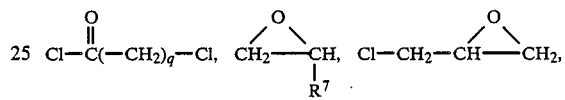

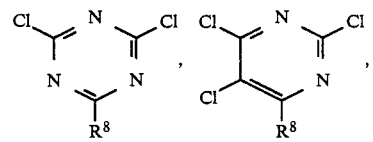

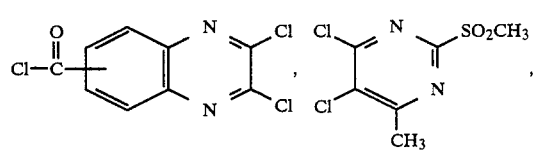

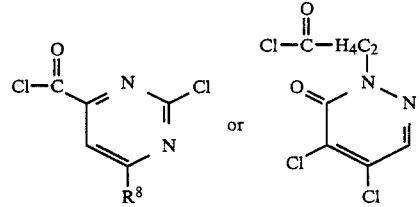

where q, $R^7$ and $R^8$ are each as defined above, or else, where possible, the corresponding bromine compounds. They are prepared in a conventional manner.

The resulting compounds, like those coupling components KH which have a carboxyl group or the aminopyridine derivative of the formula IX (with $R^4$ =chlorine), are then reacted directly with the polyethyleneimine. The reaction is advantageously carried out in aqueous solution or in a solvent, for example in an alkanol, such as methanol, ethanol, propanol, butanol or isobutanol, or in N,N-dimethylformamide, at from 20° to 150° C., preferably at from 50° to 100° C. The molar ratio for the reaction depends on the degree of polymerization of the polyethyleneimine and also on the number m of chromophore radicals which are to be linked to the polyethyleneimine and is subject to the abovementioned numerical ratios.

The reactants are mixed together, and the mixture is stirred at the abovementioned temperature for from 5 minutes to 15 hours. After the reaction has ended, the polyethyleneimine-linked coupling component generally remains in solution and can then be coupled in a conventional manner with the diazonium salt obtainable in a conventional manner from the diazo component.

In some cases, the polyethyleneimine-linked coupling component may precipitate from the reaction solution after the reaction has ended. In this case it is advisable to redissolve it by adding an acid, for example dilute acetic acid, or an alkali, for example dilute sodium hydroxide solution, and thereafter to couple it in a conventional manner with the diazonium salt of the diazo component.

However, it is also possible to prepare the monoazo or disazo dye in a conventional manner in the first stage and thereafter to link the product with the polyethyleneimine, for example by the method described above.

The novel dyes are very highly soluble, in particular in an acid medium.

The dyes of the formula I according to the invention are advantageously suitable for dyeing and printing fiber materials, for example paper, linen, cotton, leather, wool, polyamide fabrics, polyacrylonitrile, acid-modified polypropylene, polyesters or mixtures thereof. The dyeings which are produced have good fastness properties.

Preference is given to using the novel dyes for dyeing and printing cellulose-containing materials.

They are suitable in particular for preparing inks which are used in the ink jet process. The novel dyes have good application properties in this area as well.

The examples that follow will illustrate the invention in more detail. The percentages are by weight, unless otherwise stated. The $\lambda_{max}$ values were measured in 30% strength acetic acid.

EXAMPLE 1

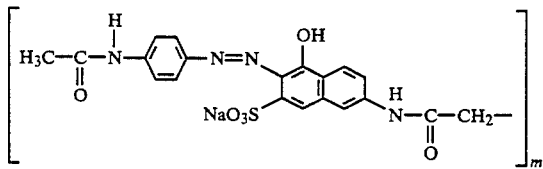

5.16 g of a 50% strength aqueous solution of a polyethyleneimine having an average molecular weight of 1500 (degree of polymerization n=35) were heated together with 3.71 g of the sodium salt of 6-chloroacetylamino-1-hydroxynaphthalene-3-sulfonic acid in the presence of 35 ml of water at 60° C. for 15 minutes. The precipitated viscous mass was redissolved with 10 ml of 30% strength acetic acid, and the solution was cooled down to from 0° to 5° C. A hydrochloric acid solution of the diazonium salt prepared fresh from 1.74 g of 86.2% pure 4-aminoacetanilide was added dropwise at a pH of from 4.4 to 4.7.

The starting materials for this batch had been chosen in such a way that the ratio m:n was 1:6.

After stirring overnight the solution was brought to pH 8 with 10% strength sodium hydroxide solution. The precipitated red dye was filtered off and dried under reduced pressure at 70° C. to leave 5 g of a dye which was readily soluble in 30% strength acetic acid ($\lambda_{max}$ 507 nm) and which produces red dyeings on cellulose fiber and is resistant to bleeding.

The procedure of Example 1 was also followed in Examples 2 to 5, except that the m:n ratio was varied in each case. The higher this ratio is, the greater the brilliancy of the dyeings is.

| Example No. | m:n | Amount of polyethyleneimine (50% strength) | Yield | $\lambda$max [nm] |
| --- | --- | --- | --- | --- |
| 2 | 1:3 | 2.58 g | 4.6 g | |
| 3 | 1:7 | 6.02 g | 5.2 g | 507 |
| 4 | 1:8 | 6.88 g | 2.25 g | 508 |
| 5 | 1:9 | 7.74 g | 3.68 g | 507 |
| 6 | 1:10 | 8.6 g | The dye remained in solution | |

EXAMPLE 7

17.2 g of a 50% strength aqueous solution of a polyethyleneimine having an average molecular weight of 4300 (degree of polymerization n=100) were heated together with 12.6 g of the sodium salt of 6-chloroacetylamino-1-hydroxynaphthalene-3-sulfonic acid in the presence of 86 ml of water and 19.2 g of 10% strength sodium hydroxide solution under reflux for 15 minutes. A further amount of 10% strength sodium hyoroxide solution was added to adjust the pH to 8.8, and the reaction mixture was then cooled down to from 5° to 10° C. A hydrochloric acid solution of the diazonium salt prepared fresh from 6.26 g of 4-aminoacetanilide (86.2%) was added dropwise. After the mixture had been stirred at from 5° to 10° C. for 2 hours the pH was 6.6. The precipitated red product was filtered off with suction and dried at 50° C. under reduced pressure ($\lambda_{max}$: 503 nm).

The starting materials for this example were chosen in such a way that the m:n ratio was 1:5.56.

In Examples 8 to 10, polyethyleneimines having different molecular weights were reacted under the same conditions as described in Example 7.

| Example No. | Average molecular weight of polyethyleneimine | Degree of polymerization n |
| --- | --- | --- |
| 8 | 2150 | 50 |
| 9 | 1500 | 35 |
| 10 | 430 | 10 |

EXAMPLE 11

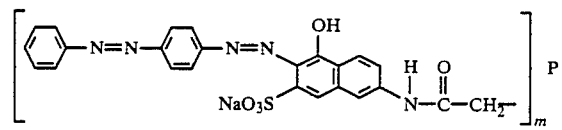

8.6 g of a 50% strength aqueous solution of a polyethyleneimine having an average molecular weight of 4300 (degree of polymerization n =100) were heated together with 6.7 g of the sodium salt of 6-chloroacetylamino-1-hydroxynaphthalene-3-sulfonic acid in the presence of 78 ml of water and 9.6 g of 10% strength sodium hydroxide solution under reflux for 15 minutes. The precipitated product was dissolved with 10% strength sodium hydroxide solution, and a hydrochloric acid solution of the diazonium salt prepared fresh from 3.54 g of 4-aminoazobenzene was added dropwise at 10° C. After the solution had been stirred for 1.5 hours, its pH was 5.7. It was brought to pH 7.8 with 10% strength sodium hydroxide solution, and all the polymeric red dye precipitated. The m:n ratio was 1:5.

An acetic acid solution of this dye dyed paper fibers in strong dull red shades.

In Examples 12 to 14, polyethyleneimines having different molecular weights were reacted in the same mixing ratios as described in Example 11.

The diazonium salt of 4-methoxyaniline, prepared fresh from 1.97 g of 4-methoxyaniline, was added dropwise at from 5 to 10° C. After two hours of stirring the solution was brought to pH 7 with 10% strength sodium hydroxide solution, and the precipitated polymeric red dye was filtered off on a sintered glass crucible. An acetic acid solution of this dye dyed paper fibers in a red color showing good resistance to bleeding. The starting materials for the reaction were chosen in such a way that the m:n ratio was 1:6 ($\lambda_{max}$:508 nm).

The dye of Example 16 was prepared in a similar manner.

| Example No. | Amine | Polyethyleneimine average molecular weight | Degree of polymerization n | Hue on paper | $\lambda$max [nm] |
| --- | --- | --- | --- | --- | --- |
| 16 | ⟨phenyl⟩—NH$_2$ | 4300 | 100 | orange | 487 |

EXAMPLE 17

[structure: OCH$_3$-phenyl-N=N-(naphthalene with OH, NaO$_3$S, NH—CO—CH$_2$—CH$_2$—)]$_m$ ]$_P$

| Example No. | Average molecular weight of polyethyleneimine | Degree of polymerization n |
| --- | --- | --- |
| 12 | 2150 | 50 |
| 13 | 1500 | 35 |
| 14 | 430 | 10 |

EXAMPLE 15

[structure: CH$_3$O—phenyl—N=N—(naphthalene with OH, NaO$_3$S, N(H)—C(=O)—CH$_2$—)]$_m$ ]$_P$ 8.6 g of a 50% strength aqueous solution of a polyethyleneimine having an average molecular weight of 1500 (degree of polymerization n =35) were heated together with 6.73 g of the sodium salt of 6-chloroacetyl-amino-1-hydroxynaphthalene-3-sulfonic acid in the presence of 79 ml of water and 9.6 g of 10% strength sodium hydroxide solution under reflux for 15 minutes. 30% strength acetic acid was used to adjust the pH to 8, and the aqueous phase (top phase) was decanted off. The residue was dissolved with 150 g of 30% strength acetic acid and 200 g of tributylamine.

8.6 g of a 50% strength aqueous solution of a polyethyleneimine having an average molecular weight of 1500 (degree of polymerization n=35) were heated together with 7.03 g of the sodium salt of 6-chloropropionylamino-1-hydroxynaphthalene-6-sulfonic acid in 73 ml of water and 9.6 g of 10% strength sodium hydroxide solution under reflux for 5 minutes. A pH of 3.4 was set with 10% strength acetic acid, and the aqueous phase (top phase) was decanted off. The residue was dissolved in 150 g of 30% strength acetic acid and 66 g of tributylamine. The diazonium salt of 2-methoxyaniline, prepared fresh from 1.97 g of 2-methoxyaniline, was added dropwise at from 10° to 15° C. After stirring overnight the pH was 4.4. The solution was brought to pH 7 with 10% strength sodium hydroxide solution, and the precipitated red dye was filtered off with suction. From the starting materials the m:n ratio was 1:6. The dye, which was soluble in 30% strength acetic acid, produced red dyeings on paper fibers ($\lambda_{max}$:507 nm).

The dyes of Examples 18 to 27 were prepared in a manner similar to that of Example 17:

| Example No. | Diazo component D-NH$_2$ | Hue on paper | $\lambda$max [nm] |
| --- | --- | --- | --- |
| 18 | H$_3$C—C(=O)—NH—⟨phenyl⟩—NH$_2$ | orange | 495 |
| 19 | OH—⟨phenyl⟩—NH$_2$ | red | 500 |

-continued

| Example No. | Diazo component D-NH₂ | Hue on paper | λmax [nm] |
|---|---|---|---|
| 20 | 3-aminobenzaldehyde (CHO, NH₂ on benzene) | orange | 482 |
| 21 | 4-[(5-methylbenzothiazol-2-yl)methylene]aniline | red | 497 |
| 22 | 4-acetamido-2-methoxyaniline (H₃C-C(O)-NH-, OCH₃, NH₂) | red | 514 |
| 23 | 1-acetylhydrazino-2-methoxy-4-aminobenzene (H₃C-C(O)-N(N)-, OCH₃, NH₂) | red | 509 |
| 24 | 2,5-dimethoxyaniline (OCH₃, NH₂, OCH₃) | bluish red | 519 |
| 25 | 3-amino-4-methoxybenzamide (OCH₃, NH₂, CONH₂) | yellowish red | 498 |
| 26 | 4-methoxyaniline (H₃CO-, NH₂) | red | 504 |
| 27 | 4-acetamidoaniline (H₃C-C(O)-NH-, NH₂) | red | 507 |

EXAMPLE 28

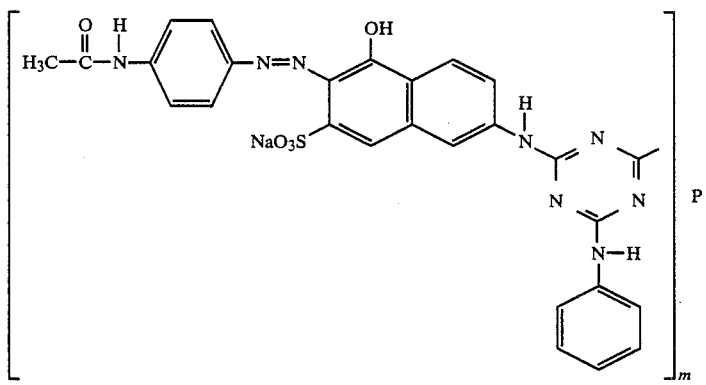

2 g of cyanuric chloride were suspended in 21 ml of ice-water and 0.02 g of 10% strength hydrochloric acid, and the suspension was added to 75 g of ice-water. A solution of 2.67 g of 6-amino-1-hydroxynaphthalene-3-sulfonic acid (93% strength), 0.92 g of 50% strength sodium hydroxide solution and 30 ml of water was added at 0° C. A pH of 5.5–6 was maintained for 45 minutes means of 10% strength aqueous sodium carbonate solution. The reaction mixture was filtered, and 0.95 g of aniline was added to the filtrate. The solution was heated at 40° C. for 3.5 hours and the pH was maintained at from 4 to 4.5 with 10% strength sodium carbonate solution. After stirring overnight, 8.6 g of 50% strength polyethyleneimine (degree of polymerization n=35) and 5.28 g of 10% strength sodium hydroxide solution were added to the solution, and the mixture was refluxed for 12 minutes. A pH of 7 was set with 30% strength acetic acid, and the solution was cooled down to 0° C. The diazonium salt of 4-aminoacetanilide, prepared fresh from 1.74 g of 4-aminoacetanilide (86.2%), was added dropwise to the solution in the course of 10 minutes at 0° C., and the red reaction solution was stirred overnight. It was then brought to pH 7 with glacial acetic acid. Applied in 0.4% strength to cellulose fibers it produced a red dyeing with all the dye going on to the fiber. From the starting materials the m:n ratio was 1:10 ($\lambda_{max}$:514 nm).

The dyes of Examples 29 to 35 were prepared in a similar manner.

| Example No. | Diazo component D-NH$_2$ | m:n ratio | Hue on paper | $\lambda_{max}$ [nm] |
|---|---|---|---|---|
| 29 | 2-methoxyaniline (OCH$_3$, NH$_2$) | 1:5 | red | 514 |
| 30 | H$_3$CO—C$_6$H$_4$—NH$_2$ | 1:5 | red | 514 |
| 31 | OCH$_3$, NH$_2$, H$_3$C—C(O)—NH substituted benzene | 1:10 | red | 520 |
| 32 | OCH$_3$, NH, H$_3$C—C(O)—N substituted benzene with NH | 1:10 | red | 519 |
| 33 | 2-methoxyaniline (OCH$_3$, NH$_2$) | 1:10 | red | 525 |
| 34 | OCH$_3$, NH$_2$, H$_2$N—CO substituted benzene | 1:10 | red | 506 |
| 35 | C$_6$H$_5$—N=N—C$_6$H$_4$—NH$_2$ | 1:10 | red | 518 |

EXAMPLE 36

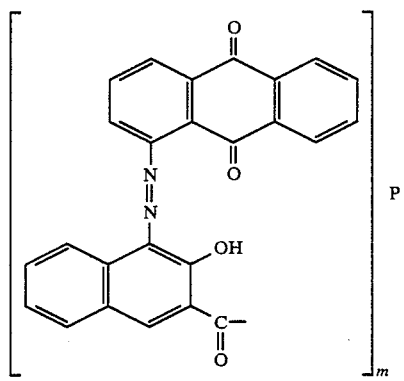

43 g of 50% strength aqueous polyethyleneimine (degree of polymerization n=100) were stirred together with 20.5 g of methyl 2-hydroxynaphthalene-3-carboxylate and 50 ml of N,N-dimethylformamide at 120° C. for 30 minutes, during which the methanol formed in the course of the reaction was distilled off. After cooling down, the solution was brought to pH 7 with acetic acid and cooled down to 10° C. The diazonium sulfate of 1-aminoanthraquinone, prepared fresh from 22.8 g of 1-aminoanthraquinone, was added dropwise together with 340 g of 10% strength sodium acetate solution. The mixture was subsequently stirred for one hour, and the precipitated polymeric dye was filtered off with suction. The solid dye was intensively stirred with 5% strength sodium hydroxide solution and filtered off with suction on a sintered glass crucible. The residue was dissolved with 30% strength acetic acid and clarified by filtration through a cloth filter. The dye gave complete exhaustion on cellulose fibers and was highly resistant to bleeding in water. The m:n ratio was 1:5 ($\lambda_{max}$:508 nm).

Examples 37 to 40 below were prepared in a similar manner. The m:n ratio was here 1:10 in each case.

ide solution, and the precipitate formed was filtered off with suction on a sintered glass crucible. The dried yellow dye was soluble in 30% strength acetic acid and produced dyeings on paper having good resistance to bleeding ($\lambda_{max}$:429 nm).

The starting materials were chosen in such a way that the m:n ratio was 1:10.

EXAMPLE 42

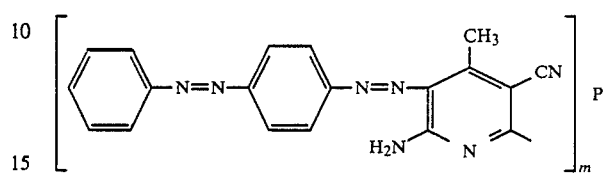

| Example No. | Diazo component D-NH₂ | Degree of polymerization n | Color | λmax [nm] |
|---|---|---|---|---|
| 37 | ![OCH3, NH2 benzene] | 14 000 | bluish red | 515 |
| 38 | ![NH2 benzene] | 14 000 | yellowish red | 498 |
| 39 | ![PhNH-C(O)-C6H4-NH2] | 14 000 | red | 498 |
| 40 | ![2,5-dichloroaniline] | 14 000 | orange | 492 |

EXAMPLE 41

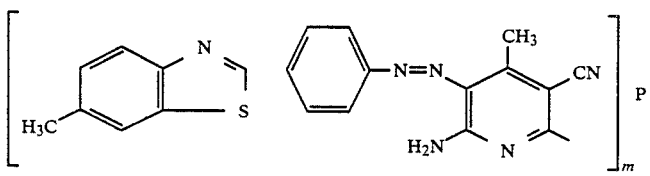

43 g of 50% strength aqueous polyethyleneimine having an average molecular weight of 600000 (degree of polymerization n=14000) were admixed with 250 ml of isobutanol and 11.2 g of 6-amino-2-chloro-3-cyano-4methylpyridine (75.1%) and heated to 108° C. while the water in the starting polyethyleneimine solution was distilled off.

After 11.5 hours 250 ml of water were added, and the mixture was cooled down and brought to pH 5.4 with 21 ml of 30% strength hydrochloric acid. The diazonium chloride of 4-(6-methylbenzothiazol-2-yl)aniline, prepared fresh from 12.64 g of 4-(6-methylbenzothiazol-2-yl)aniline (95% pure), was added dropwise at from 5° to 10° C. and stirred in for 2 hours. The mixture was brought to pH 12.5 with 10% strength sodium hydrox- The orange dye of this example was prepared in a manner similar to that of Example 41, except that the diazonium chloride of 12.64 parts of 4-(6-methylbenzothiazol-2-yl)aniline (95% pure) was replaced here by the diazonium chloride of 4-aminoazobenzene, prepared fresh from 8.35 g of 4-aminoazobenzene ($\lambda_{max}$:432 nm).

EXAMPLE 43

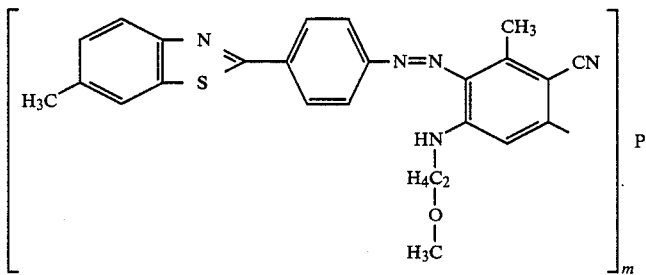

43 g of a 50% strength aqueous solution of a polyethyleneimine having an average molecular weight of (degree of polymerization n=14000) were heated together with 250 ml of isobutanol and 17.28 g of 2-chloro-3-cyano-4-methyl-6-(2-methoxyethylamino)pyridine at 145° C. for 3 hours, during which a mixture of isobutanol and water were slowly distilled off. The reaction product was dissolved with 250 ml of hot water and reacted at from 0° to 10° C. as described in Example 41 with the diazonium salt prepared fresh from 12.39 g of 4-(6-methylbenzothiazol-2-yl)aniline, giving a solution which produced yellow dyeings on cellulose fibers. The m:n ratio was 1:10 ($\lambda_{max}$:434 nm).

The dyes of Examples 44 to 47 were prepared in a similar manner:

| Example No. | Diazo component D-NH$_2$ | Hue |
|---|---|---|
| 44 | H$_3$C—C(=O)—N(H)—C$_6$H$_4$—NH$_2$ | yellow |
| 45 | 2-CN, 4-O$_2$N—C$_6$H$_3$—NH$_2$ | red |
| 46 | C$_6$H$_5$—N=N—C$_6$H$_4$—NH$_2$ | orange |
| 47 | 2-NO$_2$, 4-O$_2$N—C$_6$H$_3$—NH$_2$ | red |

EXAMPLE 48

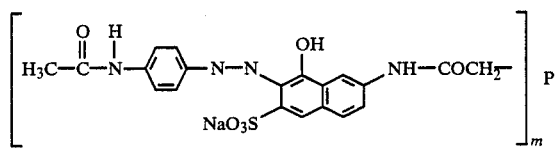

43 g of a 50% strength aqueous solution of a polyethyleneimine having an average molecular weight of 600000 (degree of polymerization n=14000) were heated together with 172 ml of water and 16.21 g of 7-chloroacetylamino-1-hydroxynaphthalene-3-sulfonic acid and refluxed for 2 hours. The reaction product was reacted at from 0° to 3° C. with the diazonium chloride prepared fresh from 8.8 g of 4-aminoacetanilide (85% pure). Once diazonium salt was no longer detectable, 243 g of glacial acetic acid were added. The solution produced red dyeings on cellulose fibers. The quantities of the starting materials had been chosen in such a way as to produce an m:n ratio of 1:10.

EXAMPLE 49

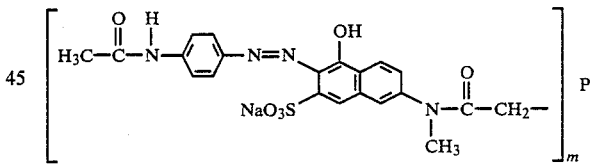

60.2 g of 50% strength aqueous polyethyleneimine having an average molecular weight of 1500 (degree of polymerization n=35) were heated together with 56.4 g of the sodium salt of 6-(N-methyl-N-chloroacetylamino)-1-hydroxynaphthalene-3-sulfonic acid in the presence of 330 ml of water at 60° C. for 15 minutes. On addition of 40 ml of glacial acetic acid a solution having a pH of 4.7 was obtained. A hydrochloric acid solution of the diazonium salt prepared fresh from 17.4 g of 4-aminoacetanilide (86.2%) was added dropwise. After 2 hours of stirring at from 0° to 5° C. the reaction mixture was brought to pH 8 with 10% strength sodium hydroxide solution, and the precipitated product was filtered off with suction on a G3 sintered glass crucible. Drying left 53.13 g of red dye whose solution in acetic acid produced dyeings on paper fibers having good resistance to bleeding. The m:n ratio was 1:7 ($\lambda_{max}$:507 nm). The dyes of Examples 50 and 51 were prepared in a similar manner:

| Example No. | kH | Degree of polymerization n | Hue on paper | λmax [nm] |
|---|---|---|---|---|
| 50 | ![structure: 1-hydroxy-7-amino-3-naphthalenesulfonate] | 35 | red | 514 |
| 51 | ![structure: 8-hydroxy-5-amino-1-naphthalenesulfonate] | 35 | violet | 537 |

EXAMPLE 52

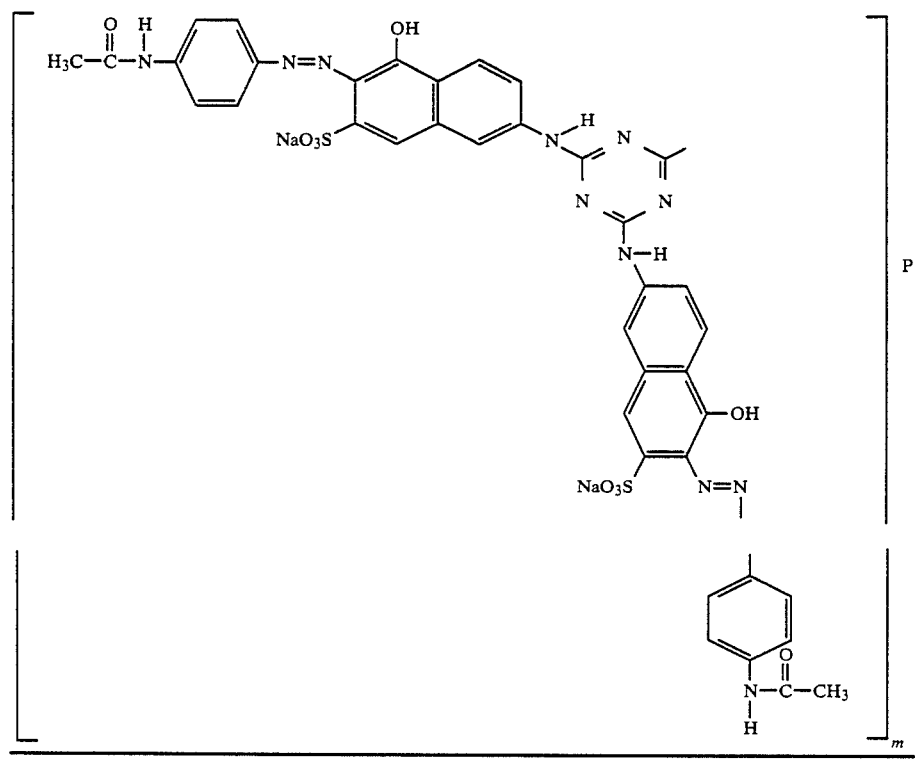

94 g of 4,6-bis(1-hydroxy-3-hydroxysulfonylnaphth-6-ylamino)-2-chlorotriazine were heated together with 2.4 g of a 10% strength sodium hydroxide solution and 6.45 g of a 50% strength aqueous solution of a polyethyleneimine (degree of polymerization n=100) under reflux for 5 minutes, and thereafter the solution was brought to pH 4.3 with 30% strength acetic acid.

An aqueous hydrochloric acid solution of a diazonium salt prepared fresh from 1.74 g of 4-aminoacetanilide was added dropwise at 5° C. in the course of 20 minutes, and the solution was stirred at the stated temperature for 3.5 hours. The solution gave red dyeings on cellulose fibers having good resistance to water of condensation. The m:n ratio was 1:15 ($\lambda_{max}$:513 nm).

The dyes of Examples 53 to 55 were prepared in a similar manner. In each case the m:n ratio was 1:20.

| Example No. | D-NH$_2$ | Hue | λmax [nm] |
|---|---|---|---|
| 53 | ![Ph-N=N-C6H4-NH2] | dull red | 520 |
| 54 | ![2-methoxyaniline] | red | 515 |
| 55 | ![H3CO-C6H4-NH2] | red | 514 |

EXAMPLE 56

[Structure: phenyl-N-N pyrazole with OH, N=N-phenyl and C=O groups]

43 g of 50% strength aqueous polyethyleneimine (degree of polymerization n=35) were heated in 50 ml of ethylene glycol together with 30.8 g of ethyl 1-phenyl- pyrazol-5-one-3-carboxylate (77.3% pure) at 150° C. Water and the ethanol formed in the course of the reaction were distilled off. Thereafter the reaction mixture was diluted with 230 ml of ice-water and 70 ml of glacial acetic acid, and a hydrochloric acid solution of the diazonium salt prepared from 7.44 g of aniline was added at 0° C. and at a pH of 3.5. After stirring for 1½ hours the solution was brought to pH 12 with 10% strength sodium hydroxide solution, and a polymeric yellow dye formed a precipitate. 55 g of dye were isolated ($\lambda_{max}$:425 nm).

The dyes of Examples 57 to 61 were prepared in a similar manner:

EXAMPLE 62 5 g of red dye of Example 1 and 89.5 g of water were brought to pH 5 with 0.5 g of glacial acetic acid. g of diethylene glycol were added to the solution. Filtration through a G4 sintered glass crucible gave an ink which was suitable for the ink jet process, producing smudgeproof script within the pH range from 4 to 9.

The same method was also suitable for converting the dyes of Example 3, 4, 5, 8, 9, 11, 12, 13, 15, 16, 18, 36, 44, 46 and 49 into inks for the ink jet process.

We claim:

1. A polyethyleneimine-containing azo dye of the formula I:

$$[(D-N=N-K-)_pX-]_mP \qquad (I)$$

where
D is the radical of a diazo component which is aniline which is unsubstituted or substituted with $C_1-C_4$-alkyl, halogen, hydroxyl, $C_1-C_4$-alkoxy, $C_1-C_4$-alkanoyl, amino, nitro, formyl, $C_1-C_4$-alkoxycarbonyl, carbamoyl, $C_1-C_4$-monoalkyl- or dialkylcarbamoyl, cyano, benzothiazol-2-yl or $C_1-C_4$-alkyl-benzothiazol-2-yl, and which is free of hydroxysulfonyl groups,
K is the radical of a coupling component which is (1) hydroxynaphthalene which is unsubstituted or substituted with hydroxysulfonyl, carboxyl, $C_1-C_4$-alkoxycarbonyl, amino or $C_1-C_4$-monoalkylamino, or (2) aminopyridine of the formula

| Example No. | D-NH₂ | Hue | λmax [nm] |
|---|---|---|---|
| 57 | phenyl-N=N-phenyl-NH₂ | orange | 453 |
| 58 | H₃C-C(=O)-N(H)-phenyl-NH₂ | orange | 451 |
| 59 | methylbenzothiazole-phenyl-NH₂ | orange | 449 |
| 60 | H₃C-C(=O)-NH-phenyl-NH₂ | yellow | 431 |
| 61 | H₅C₂O-C(=O)-phenyl-NH₂ | yellow | 406 |

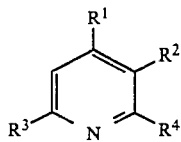

where
- $R^1$ is $C_1$–$C_4$-alkyl,
- $R^2$ is hydrogen, cyano or carbamoyl,
- $R^3$ is hydrogen, hydroxyl, $C_1$–$C_6$-alkoxy, which may be interrupted by one or two oxygen atoms, substituted or unsubstituted phenoxy, amino, $C_1$–$C_6$-monoalkyl- or dialkyl-amino, where the alkyl chain may in each case be interrupted by one or two oxygen atoms, or substituted or unsubstituted phenylamino, and
- $R^4$ is chlorine or the radical $R^3$, $R^3$ being as defined above, which, if substituted by hydroxysulfonyl, has at most one hydroxysulfonyl group, or (3) methyl- or ethyl-acetoacetate, y is 1 or 2, X is a covalent bond or a bridge member if y is 1 or a bridge member if y is 2, and P is the radical of a polyethyleneimine whose degree of polymerization n is from 5 to 25,000, and the number m of chromophore radicals is dependent upon the degree of polymerization n and is defined by the ratio m:n=from 1:1 to 1:35, with the proviso that when K is substituted by hydroxysulfonyl, the ratio m:n is from 1:2 to 1:35.

2. A polyethyleneimine-containing azo dye as claimed in claim 1, wherein K is the radical of a coupling component which is unsubstituted or substituted hydroxynaphthalene.

3. A polyethyleneimine-containing azo dye as claimed in claim 1, wherein K is the radical of a coupling component which is unsubstituted or substituted 2-aminopyridine.

* * * * *